(12) United States Patent
Byers et al.

(10) Patent No.: US 10,979,302 B2
(45) Date of Patent: Apr. 13, 2021

(54) META BEHAVIORAL ANALYTICS FOR A NETWORK OR SYSTEM

(71) Applicant: Cisco Technology, Inc., San Jose, CA (US)

(72) Inventors: Charles Calvin Byers, Wheaton, IL (US); Gonzalo Salgueiro, Raleigh, NC (US); Joseph Michael Clarke, Raleigh, NC (US); M. David Hanes, Lewisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 159 days.

(21) Appl. No.: 15/830,797

(22) Filed: Dec. 4, 2017

(65) Prior Publication Data

US 2019/0173762 A1 Jun. 6, 2019

(51) Int. Cl.
*H04L 12/24* (2006.01)
*G06F 9/50* (2006.01)
*G06N 20/00* (2019.01)

(52) U.S. Cl.
CPC .......... *H04L 41/14* (2013.01); *G06F 9/5083* (2013.01); *G06N 20/00* (2019.01); *H04L 41/0631* (2013.01); *H04L 41/06* (2013.01); *H04L 41/147* (2013.01); *H04L 41/16* (2013.01)

(58) Field of Classification Search
CPC ..... H04L 41/14; H04L 41/0631; H04L 41/06; H04L 41/147; H04L 41/16; G06N 20/00; G06F 9/5083
See application file for complete search history.

(56) References Cited

U.S. PATENT DOCUMENTS

| | | | |
|---|---|---|---|
| 6,742,128 B1 * | 5/2004 | Joiner | H04L 63/1408 726/25 |
| 7,895,320 B1 * | 2/2011 | Oggerino | H04L 41/507 709/202 |
| 9,332,028 B2 | 5/2016 | Xaypanya et al. | |
| 9,401,932 B2 | 7/2016 | Deerman et al. | |
| 9,686,312 B2 | 6/2017 | Di Pietro et al. | |
| 9,699,205 B2 | 7/2017 | Muddu et al. | |

(Continued)

OTHER PUBLICATIONS

"NetFlow Analyzer | Advanced Security Analytics Module (ASAM)", https://www.manageengine.com/products/netflow/network-behavior-analysis-using-advanced-security-analytics-module.html, last accessed Dec. 3, 2017, 6 pages.

(Continued)

*Primary Examiner* — Wing F Chan
*Assistant Examiner* — Billy H Ng
(74) *Attorney, Agent, or Firm* — Edell, Shapiro & Finnan, LLC

(57) ABSTRACT

Meta behavioral analytics techniques include, at one or more network devices that are operatively coupled to a plurality of behavioral analytics systems associated with a network or system, monitoring data outputs of the plurality of behavioral analytics systems that are representative of activity in the network or system. The one or more network devices correlate the data outputs from two or more of the plurality of behavioral analytics systems that are dedicated to analyzing different subject matter domains. Additionally, based on the correlating, the one or more network devices detect a previously unidentified condition in (a) the network or system; or (b) one of the plurality of behavioral analytics systems.

20 Claims, 7 Drawing Sheets

(56) References Cited

U.S. PATENT DOCUMENTS

| | | | |
|---|---|---|---|
| 10,063,582 B1* | 8/2018 | Feng | H04L 63/1433 |
| 2004/0205374 A1* | 10/2004 | Poletto | H04L 41/064 |
| | | | 714/4.2 |
| 2016/0014149 A1 | 1/2016 | Bradley et al. | |
| 2017/0103213 A1 | 4/2017 | Di Pietro et al. | |
| 2017/0220938 A1* | 8/2017 | Sainani | G06N 20/00 |
| 2017/0251013 A1* | 8/2017 | Kirti | H04L 63/1416 |
| 2017/0279834 A1 | 9/2017 | Vasseur et al. | |
| 2017/0279835 A1 | 9/2017 | Di Pietro et al. | |
| 2019/0166024 A1* | 5/2019 | Ho | G06N 20/00 |

OTHER PUBLICATIONS

Tao Zhang, "Crowd Control Takes Many Forms to Secure Fog Computing and IoT", blogs.cisco.com, Feb. 9, 2017, about:reader?url=https://blogs.cisco.com/innovation/crowd-control-take . . . , 4 pages.

Wikipedia Page, "Meta-analysis", en.wikipedia.org, about:reader?url=https://en.wikipedia.org/wiki/Meta-analysis, last accessed Dec. 3, 2017, 24 pages.

* cited by examiner

META BEHAVIORAL ANALYTICS FOR A NETWORK OR SYSTEM

TECHNICAL FIELD

The present disclosure relates to network analysis.

BACKGROUND

During network testing and/or monitoring, multiple behavioral analytics systems monitor a network and apply various analytical algorithms to the data flowing through and/or being output by the network in order to correlate and/or organize the data outputs as needed. Consequently, these systems can detect or analyze issues in the network, including such as security, privacy and performance optimization issues, in various network elements, report them, and/or take automatic actions to correct them. However, in some instances, the behavioral analytics systems may experience issues themselves. For example, behavioral analytics systems may be subject to hacking, data breaches, and performance deficits. Unfortunately, behavioral analytics systems are typically not monitored by another entity (instead, these systems are performing the monitoring) and, thus, if the analytics systems are compromised, it may be difficult to discover the issue, let alone to recover from the issue.

Moreover, typically behavioral analytics systems are siloed so that each behavioral analytics system only analyzes a specific aspect of system or network behavior, such as security, performance, predictive maintenance, or efficiency, or extracts key insights using big data or data mining techniques. In these siloed deployments, various behavioral analytics systems often do not coordinate or correlate their results in any manner. In fact, often, different behavioral analytics systems generate outputs in various formats that are incompatible with other types of behavioral analytics systems and/or other types of behavioral of the same type (i.e., a security-focused behavioral analytics system may output reports that are incompatible with reports output by performance-focused behavioral analytics systems and/or other security-focused behavioral analytics systems, for example, due to the type or formatting of data included in the report).

DESCRIPTION OF EXAMPLE EMBODIMENTS

Overview

Figure 1A:
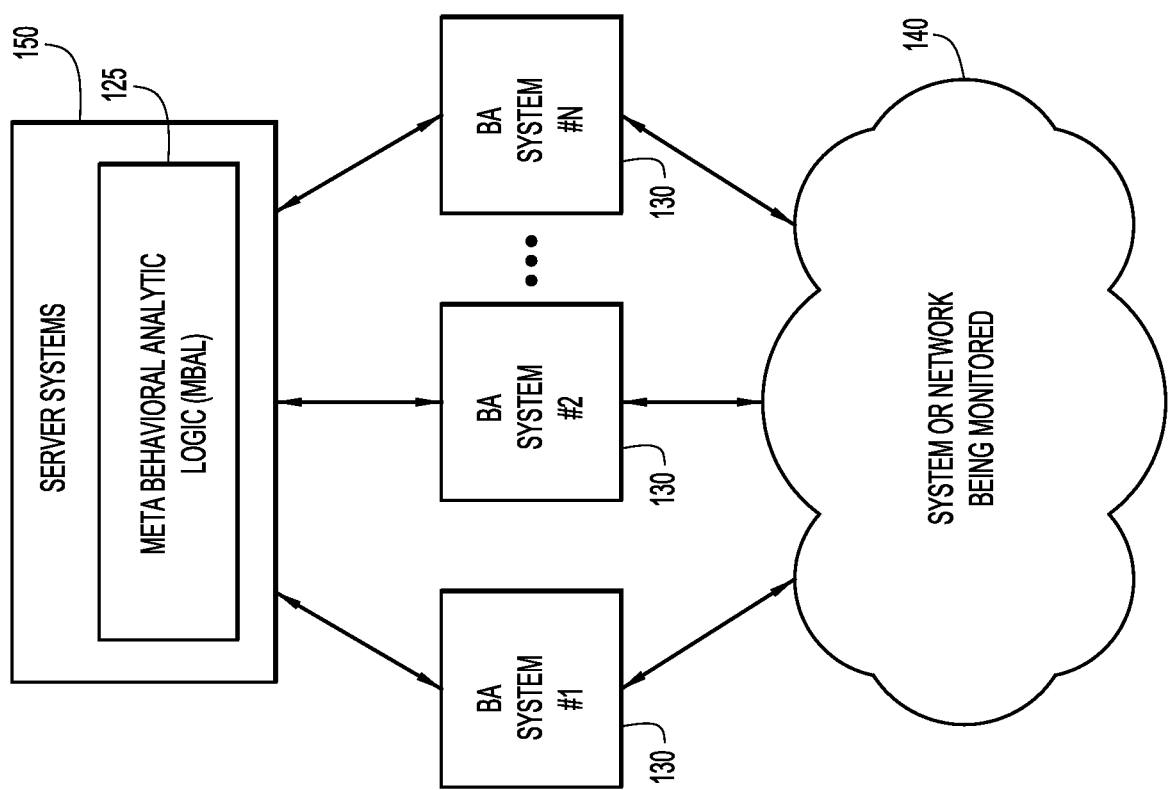
FIG. 1A is a diagram illustrating a first networking or computing system environment in which the techniques presented herein may be employed, according to an example embodiment.

Techniques are presented herein for meta behavioral analytics. These techniques leverage and correlate behavioral analytics systems to identify previously unidentified issues (i.e., errors, security breaches, performance problems, etc.) and may be embodied as a method, an apparatus, a system, and instructions in a computer-readable storage media to perform the method.

According to at least one example embodiment, meta behavioral analytics techniques include, at one or more network devices that are operatively coupled to a plurality of behavioral analytics systems associated with a system or network, monitoring data outputs of the plurality of behavioral analytics systems that are representative of activity in the system or network. The one or more network devices correlate the data outputs from two or more of the plurality of behavioral analytics systems that are dedicated to analyzing different subject matter domains. Additionally, based on the correlating, the one or more network devices detect a previously unidentified condition in (a) the network or system; or (b) one of the plurality of behavioral analytics systems.

Example Embodiments

Presented herein are meta behavioral analytical techniques that leverage and correlate behavioral analytics systems to identify previously unidentified issues (i.e., errors, security breaches, performance problems, etc.) in a network/system or a behavioral analytics system directly associated with the network/system (i.e., "first-line behavioral analytics systems"). The techniques are referred to as "meta" behavioral analytical techniques because the techniques operate in a level of the analytics hierarchy that is above the traditional first-line behavioral analytics systems. Operating at this level provides the techniques with wide visibility across a network or system and allows the techniques to correlate data from the various first-line behavioral analytics systems and/or actions taken by various first-line behavioral analytics systems in order to identify previously unidentified issues in the network or system (i.e., by generating system- or network-wide inferences or locating root causes). That is, the techniques may be able to provide a more holistic view of the system or network. Moreover, by operating at a higher level (i.e., a higher order), the behavioral analytics presented herein may monitor the security, privacy, performance, etc. of first-line behavioral analytics systems to determine if the first-line behavioral analytics systems are operating within acceptable parameters.

More specifically, in complex networks or computing systems (e.g., complex cloud, industrial, broadband access, wireless, or Internet of Things (IoT) networks or systems), various behavioral analytics systems run in parallel to monitor various aspects of the system or network. The techniques presented herein can monitor each of these behavioral analytics systems to ensure each system is performing adequately (i.e., has not been compromised and/or is utilizing accurate training data). The techniques can also correlate and coordinate the operations of multiple specialized analytics systems into a holistic view. For example, the techniques presented herein may employ machine learning techniques to discover patterns of usual operation in the mainstream analytics systems without explicit testing, and detect any discrepancies or radical changes in behavior. Additionally or alternatively, the techniques provided herein may automatically respond to identified issues/problems/discrepancies/breaches (collectively referred to as previously unidentified issues). Consequently, the techniques presented herein may be valuable when deploying, expanding and/or installing network or system analytics. Moreover, the techniques presented herein may be valuable during operations of a behavioral analytics system at least because the techniques may ensure that the behavioral analytics system are operating properly (i.e., the techniques may ensure health, security, and veracity of a multitude of behavioral analytics systems).

Without the techniques presented herein, behavioral analytics systems may still monitor various systems of a network or computing system; however, these systems may be unaware of each other and/or unable to communicate with each other. Moreover, the behavioral analytics systems may be unable to provide any indication or alert when compromised (i.e., hacked, breached, overloaded, failing hardware or software, etc.) or otherwise malfunctioning. To combat this, in some instances, security analytics systems may be distributed; however, these security systems still do not communicate with other types of behavioral analytical systems (i.e., behavioral analytical systems focused on performance). Additionally or alternatively, in some deployments, a network may utilize machine learning techniques to tune a behavioral analytics system; however, again, these machine learning techniques typically do not enable cross-correlation between behavioral analytical systems of the same type, let alone various types of types of behavioral analytical systems.

Figure 1B:
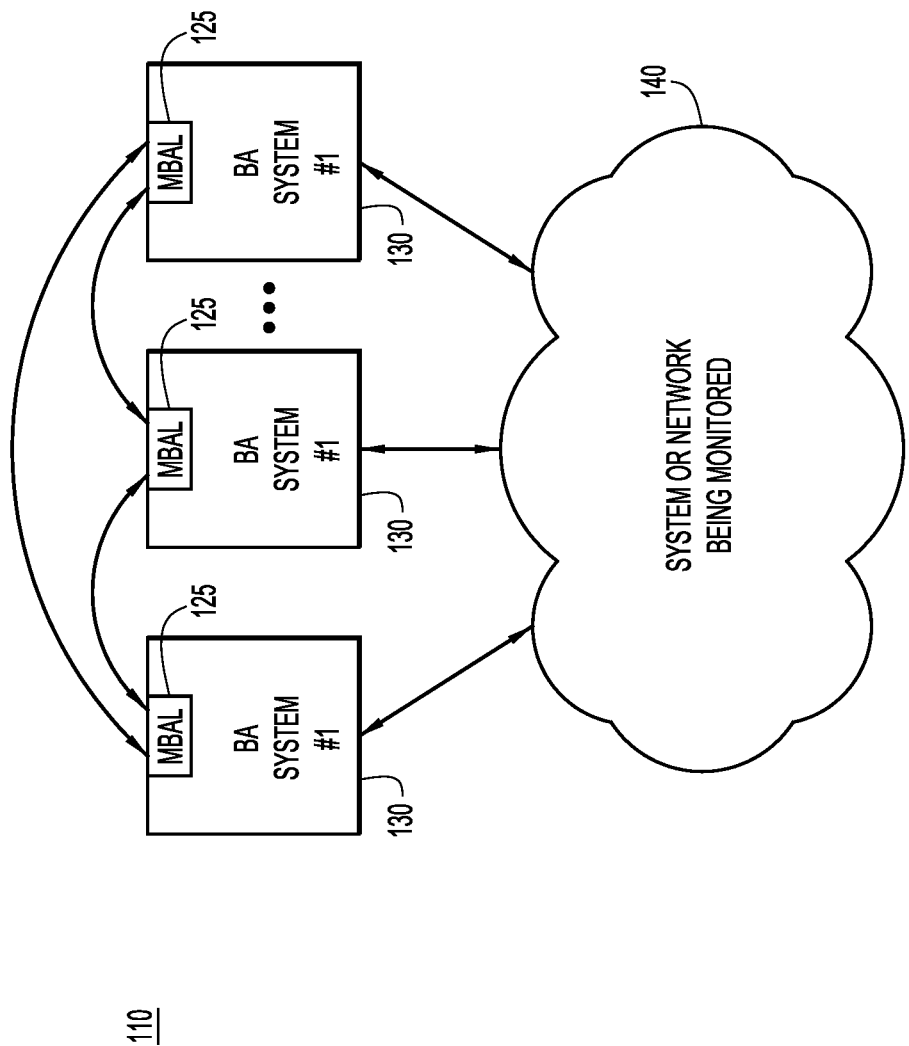
FIG. 1B is a diagram illustrating a second networking or computing system environment in which the techniques presented herein may be employed, according to an example embodiment.
Figure 1C:
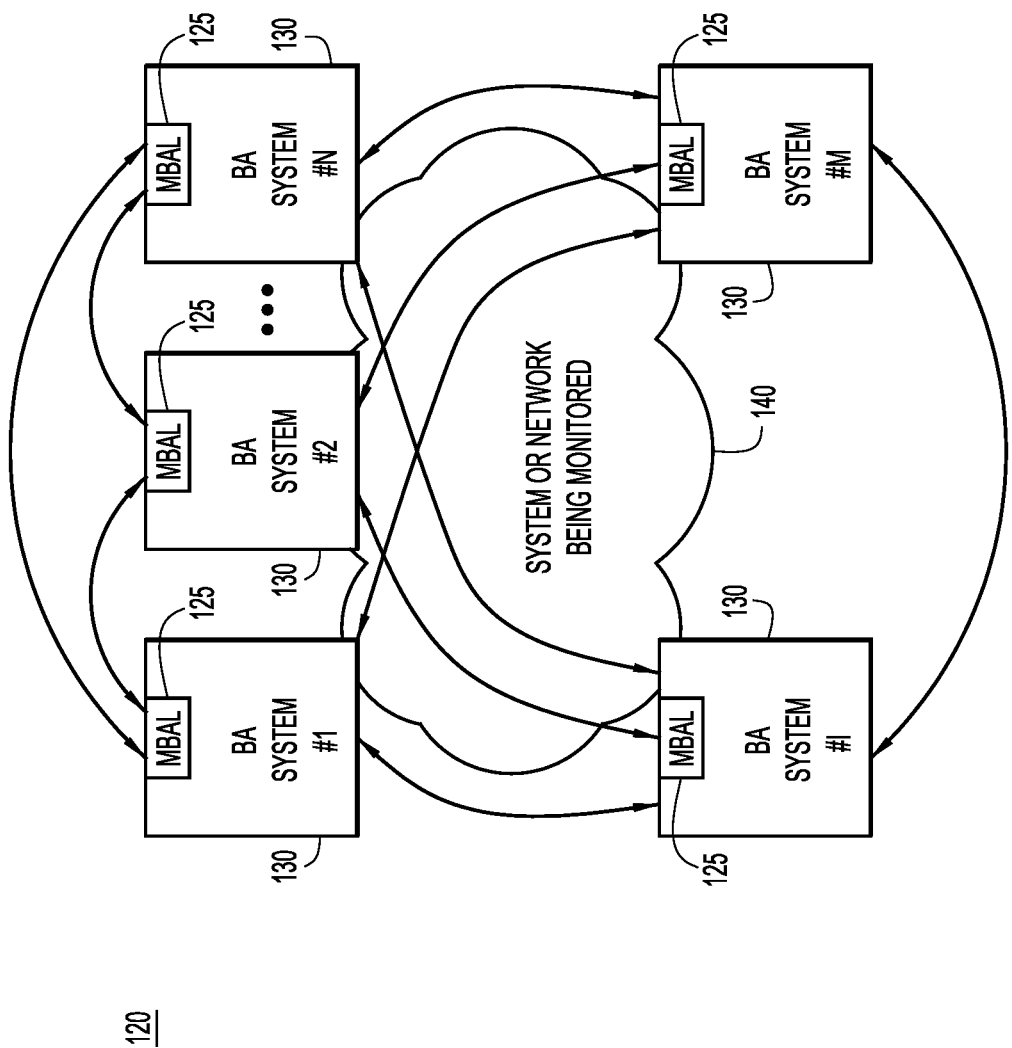
FIG. 1C is a diagram illustrating a third networking or computing system environment in which the techniques presented herein may be employed, according to an example embodiment.

Reference is first made to FIGS. 1A-C for a description of network or computing system environments in which the techniques presented herein may be employed, according to at least some example embodiments. Generally, FIG. 1A depicts a centralized network or computing system environment 100 in which the techniques presented herein are executed on one or more centralized network devices. By comparison, FIGS. 1B and 1C depict network or computing system environments 110 and 120, respectively, in which the techniques presented herein are executed on one or more distributed network devices. However, in various embodiments, the embodiments depicted in FIG. 1A-C may be combined in any manner, such as to form a hybrid or partially distributed deployment. Moreover, regardless of the particular deployment/architecture, the techniques presented herein are executed in based on instructions included in meta behavioral analytical logic 125 and the techniques are configured to monitor actions taken by and data output by a plurality of behavioral analytical systems 130 that are monitoring a network or system 140 (as is shown in each of in each of environments 100, 130, and 140). Although not shown, the network or system 140 may include any combination of network devices, such as routers, switches, endpoint devices, servers, gateways, optical transport engines, firewalls, access points, fog nodes, IoT devices and other such network devices.

More specifically, in FIG. 1A, the network/computing system environment 100 includes a network 140 and a plurality of behavioral analytical systems 130 that are operatively coupled to one or more of the plurality of network devices in the network 140. Moreover, in environment 100, the meta behavioral analytical logic 125 resides on a server system 150 that is operatively coupled to the plurality of behavioral analytical systems 130 (BA Systems #1, #2, and #N). That is, in FIG. 1A, the meta behavioral analytical logic 125 resides on a centralized meta analytics system. The centralized meta analytics system may be located in a trusted high layer of the network 140, such as in a network operations center or, alternatively, the centralized meta analytics system may be partially or completely external to the network 140 (i.e., server systems 150 may be external to the network 140). Regardless, the centralized meta analytics system continuously monitors and tests the plurality of lower order (i.e., first-line) behavioral analytical systems 130, correlates their outputs, and takes actions (e.g., generating a report or remediating an identified issue), as is explained in further detail below in connection with FIGS. 2-4. An example network device that may be representative of any of the network devices in the network 140, any of the behavioral systems 130 and/or the external server system 150 is described in further detail below in connection with FIG. 5.

By comparison, and as shown in FIGS. 1B and 1C, in network/computing system environments 110 and 120, the meta behavioral analytical logic 125 is distributed over a plurality of network devices so that one or more network devices operate collectively to test the plurality of lower order (i.e., first-line) behavioral analytical systems 130, correlate their outputs, and take actions (e.g., generating a report or remediating an identified issue). That being said, distributed environments 110 and 120 are slightly different; environment 110 illustrates a distributed environment that allows for correlation between duplicate or redundant behavioral analytical systems 130 (i.e., behavioral analytical systems 130 of the same type) while environment 110 illustrates a distributed environment that allows for correlation between behavioral analytical systems 130 of different types (e.g., a security-focused behavioral analytical system 130 and a performance-focused behavioral analytical systems 130).

Environments 110 and 120 are each described in further detail below; however, before describing the details of environment 110 and 120, it is reiterated that in various embodiments, the embodiments depicted in FIG. 1A-C may be combined in any manner. That is, environments 110 and 120 are not intended to show that the techniques presented herein may only monitor behavioral analytical systems 130 of the same type or different types. Instead, aspects of environments 110 and 120 may be combined (with or without aspects of environment 100) in any manner to monitor a multitude of behavioral analytical systems 130, including duplicate/redundant behavioral analytical systems 130 and/or behavioral analytical systems 130 of various types. In fact, in some embodiments, the techniques presented herein may deployed in a hierarchical structure (still above the first-line behavioral analytical systems), with various layers (e.g., a centralized system may sit above layers of sub-centralized and/or distributed systems), for example, to offer flexible compatibility with for fog and/or cloud hierarchical networks and complex IoT installations.

Now turning to FIG. 1B, environment 110 (shown in FIG. 1B), includes three instances of a duplicated behavioral analytics systems 130 (BA System #1) and the meta behavioral analytical logic (MBAL) 125 is distributed over each of these instances. Consequently, in operation, the three instances of behavioral analytical logic 125 allow the duplicated/redundant behavioral analytics systems 130 to communicate in order to monitor for divergence by at least one of the instances. That is, as each of the duplicated behavioral analytics systems 130 monitors the network or system 140 in accordance with identical responsibilities (i.e., security responsibilities), each of the duplicated behavioral analytics systems 130 also monitors its sister systems (i.e., the other duplicate behavioral analytics systems 130). Consequently, if one of behavioral analytics systems 130 diverges from normal operations (perhaps because it is overloaded and/or it has been hacked), the meta behavioral analytical logic 125 on the other sister systems may discover this anomaly and take automatic actions to isolate and repair the problem, as is explained in detail below. Notably, this distributed and redundant aspects of environment 110 may provide at least some scalability and reliability advantages.

Finally, in the environment 120 depicted in FIG. 1C, the meta behavioral analytical logic 125 is fully distributed over a suite of behavioral analytics systems 130 of different types, each of which are monitoring the network or system 140. Consequently, based on instructions from the meta behavioral analytical logic 125, the various behavioral analytics systems 130 may check various network elements in the network or system 140 so that the techniques presented herein are distributed throughout all the elements of the entire system or network or system 140. This distribution may increase the complexity of the techniques, but may also provide increased scalability and reliability.

Figure 2:
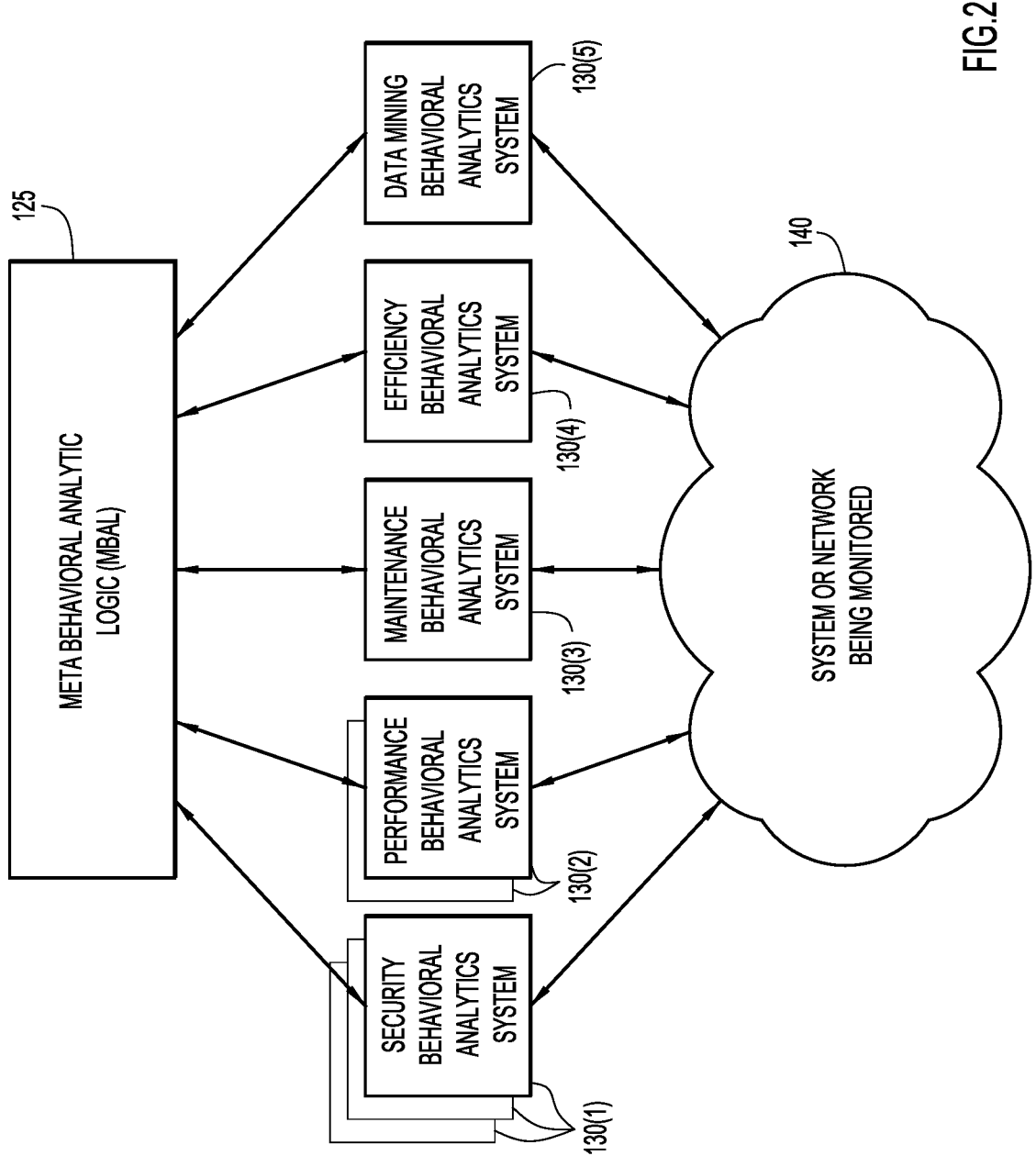
FIG. 2 is a diagram depicting operations of the meta behavioral analytical techniques presented herein, according to an example embodiment.

Referring next to FIG. 2 for a description of a diagram 200 depicting example operations of the meta behavioral analytical techniques presented herein. Reference is also made to FIG. 1A-C for the purposes of the description of FIG. 2 and like labels are used for similar components in each of these Figures. However, for simplicity, the meta behavioral analytical logic 125 is shown as a stand-alone element in FIG. 2, with the understanding that the meta behavioral analytical logic 125 may reside on one or more network devices, as is shown and described in connection with FIGS. 1A-C. That being said, in FIG. 2, the meta behavioral analytical logic 125 is correlating data between one or more instances of five behavioral analytics systems 130 that are each dedicated to analyzing different subject matter domains, including: three instances of a security behavioral analytics system 130(1); two instances of a performance behavioral analytics system 130(2); one instance of a maintenance behavioral analytics system 130(3); one instance of an efficiency behavioral analytics system 130(4); and one instance of a data mining behavioral analytics system 130(5). That is, in FIG. 2, the meta behavioral analytical logic 125 is correlating data outputs from five different types of behavioral analytics systems 130.

Generally, meta behavioral analytical logic 125 uses the outputs of the first order (i.e., front line) behavioral analytical systems, such as behavioral analytics systems 130(1)-130(5), as its primary inputs. First order systems, such as behavioral analytics systems 130(1)-130(5), are below the meta behavioral analytical logic 125 in the network or system hierarchy and, thus, the outputs of the behavioral analytics systems 130(1)-130(5) may be representative of activity in the network or system 140. More specifically, the behavioral analytics systems 130(1)-130(5) may be collocated with or in direct communication with elements (i.e., network elements) in the network or system 140 and, therefore, may be able to generate reports, alarms, recommendations, and/or insights that are representative of traffic flowing through the network or system and/or data output by the network or system. In some embodiments, the behavioral analytics systems 130(1)-130(5) may also take actions in response to their own reports, alarms, recommendations, and/or insights.

In turn, the meta behavioral analytical logic 125 may monitor any or all of these reports, alarms, recommendations, and insights, as well as data representative of the actions taken by a particular analytics system 130. That is, the meta behavioral analytical logic 125 may correlate and coordinate data that is generated by one or more of the analytics systems 130(1)-130(5) (or instances thereof) and is representative of activity in the network or system. Then, based on this correlating and coordinating, one or more network devices executing instructions of the meta behavioral analytical logic 125 may generate a set of highly insightful, well filtered reports, as well as automated responses to various types of network or system conditions.

As a more specific example, if multiple behavioral analytics systems 130 are monitoring the same network parameters, the meta behavioral analytical logic 125 may compare their outputs to detect a divergence in the outputs. The divergence may indicate that one of the instances/systems is malfunctioning. For example, the meta behavioral analytical logic 125 may employ machine learning techniques to compare the three instances of the security behavioral analytics system 130(1) based on various types of context data, including the history of this network, observations from similar networks, databases of root causes/problems/solutions, and real-time data about emerging security threats or network load inducing events. If the meta behavioral analytical logic 125 detects a divergence in the outputs of one of the instances of the security behavioral analytics system 130(1) (the outputs may indicate performance problems or security breaches, as well as actions taken in response to a detected problem/breach), the meta behavioral analytical logic 125 may analyze the divergence and generate an inference that the divergent instance is malfunctioning (e.g., because the divergent instances has been infected with malware). Consequently, the meta behavioral analytical logic 125 may cause the divergent instance of the security behavioral analytics systems 130(1) to be shut down, reset, updated, or taken off-line. Additionally or alternatively, the meta behavioral analytical logic 125 may generate a report detailing the divergence of the particular instance.

Still referring to FIG. 2, typically, each of the domain-specific analytics systems 130(1)-130(5) are dedicated to analyzing (i.e., focused on) a single aspect (i.e., subject matter domain) of network or system operations (i.e., security, performance, predictive maintenance, efficiency optimization, and data mining, as implied by their names). Consequently, each of analytics systems 130(1)-130(5) may run on its own infrastructure and/or may not be interconnected. In fact, in some embodiments, each of analytics systems 130(1)-130(5) may be provided by different suppliers with their own domain-specific expertise. For example, the three instances of the security behavioral analytics systems 130(1) may each monitor for security breaches and may not be directly interconnected with the two instances of performance behavioral analytics systems 130(2) that are monitoring network or system performance. However, the meta behavioral analytical logic 125 eliminates any disconnects between the analytics systems 130(1)-130(5). This may be particularly valuable since many of the most important occurrences in a complex system or network can generate impacts across many of these analytics domains.

More specifically, the meta behavioral analytical logic 125 serves as a higher level analytics system that is able to tie together, correlate, and coordinate all the specialized analytics systems 130(1)-130(5) that are each dedicated to analyzing different subject matter domains, resulting in much better awareness and control over the underlying system or network 140. That is, the meta behavioral analytical logic 125 can tie together different domain-specific analytics engines, such as the specialized analytics systems 130(1)-130(5), into a system-wide view. For example, if the three instances of the security behavioral analytics systems 130(1) are not interconnected with either of the two instances of performance behavioral analytics systems 130 (2), as mentioned in the example above, the security behavioral analytics systems 130(1) may notice password attacks, and the performance behavioral analytics system 130(2) may notice network slowdown, but systems 130(1) and system 130(2) may be unaware of the effect or cause, respectively. The meta behavioral analytical logic 125 may resolve this disconnect by analyzing outputs (i.e., reports) from system 130(1) and system 130(2) and correlating outputs (i.e., based on common timestamps, common device identifiers, historical attacks and slowness, etc.) to draw conclusions from its broader perspective (i.e., that a spoofing attack is underway and causing a network slowdown). Then, the meta behavioral analytical logic 125 may create more immediately valuable alarms or deploy more effective system-wide solutions.

In at least some embodiments, the meta behavioral analytical logic 125 may employ machine learning techniques in order to perform the analyzing, the correlating, and/or the deploying of system-wide solutions. Additionally or alternatively, the underlying behavioral analytics systems 130 (1)-130(5) may employ machine learning techniques when analyzing system or network activity and generating outputs representative of this activity (e.g., reports, alerts, etc.). In embodiments where the underlying behavioral analytics systems 130(1)-130(5) employ machine learning techniques, the cross-checks performed by the meta behavioral analytical logic 125 (i.e., the cross correlating between specialized behavioral analytics systems 130(1)-130(5) of different types) may be used to spot errors (i.e., early skew) in the training data being fed to one of behavioral analytics systems 130(1)-130(5) for reinforced learning. If this error is spotted early, then potentially incorrect decisions can be averted by the particular underlying behavioral analytics system. That is, the meta behavioral analytical logic 125 may improve the quality of the training data for each specialized analytics system 130(1)-130(5).

In turn, this may improve the machine learning techniques employed by the meta behavioral analytical logic 125 (e.g., by improving the accuracy of inputs into the meta behavioral analytical logic 125), providing higher quality and faster training. Among other advantages, the faster and more accurate analysis performed by the meta behavioral analytical logic 125 may render the system or network 140 more robust in the face of hacking, incorrect configuration, or performance challenges (e.g., due to increased awareness and better performance of the behavioral analytics system 130(1)-130(5)). More generally, the techniques presented herein may greatly reduce the time it takes to discover problems within analytics systems and/or an underlying system or network. Since, in at least some embodiments, the responses (e.g., trouble resolution reactions) to identified issues/conditions may be automated, the techniques presented herein may also automatically improve the underlying system or network.

Figure 3:
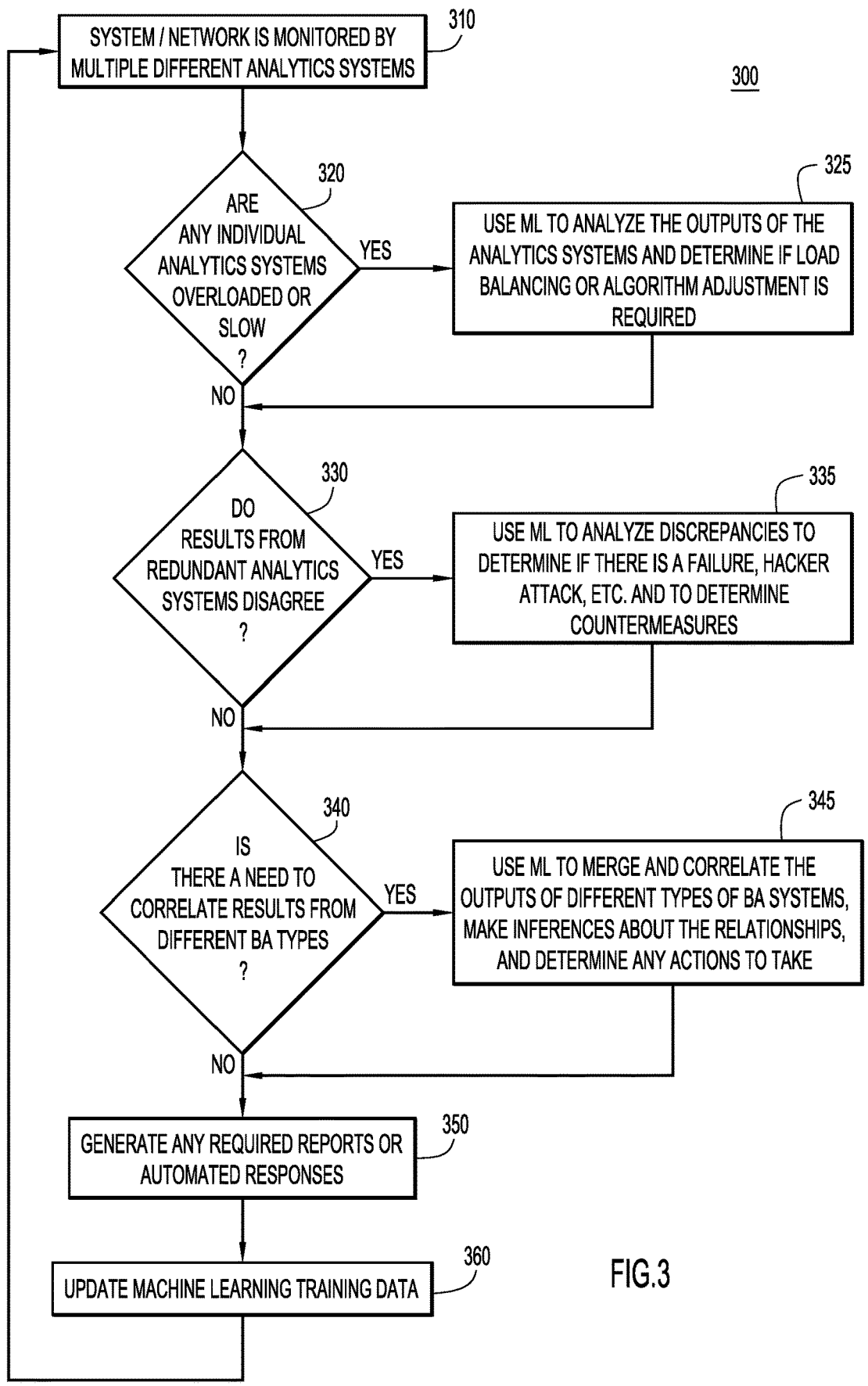
FIG. 3 is a flow chart depicting operations performed by one or more computing devices when executing the meta behavioral analytical techniques presented herein, in accordance with an example embodiment

Now referring to FIG. 3 for a description of flow chart of a method 300 depicting operations performed by one or more network devices when executing the meta behavioral analytical logic 125 in accordance with an example embodiment. Reference is also made to FIGS. 1A-C and 2 for purposes of the description of FIG. 3. Initially, at 310, a system or network is monitored by multiple behavioral analytics systems, including behavioral analytics system of different types, such as the behavioral analytics system 130(1)-130(5) shown in FIG. 2. Any outputs (i.e., reports) from the behavioral analytics systems are routed to the meta behavioral analytical logic 125 which may utilize machine learning to monitor and correlate the data from the lower level analytics systems. As a more concrete example, a university that operates a large campus data network may utilize a single performance analytics system and two parallel security analytics systems, set up in a redundant configuration (i.e., to provide some fault tolerance because of the critical nature of network security), to monitor its network. Thus, in this example, at 310, the performance analytics system continuously monitors the performance, latency, jitter, load factors, etc. of the entire network and the two security analytics systems monitor for suspicious activity, evidence of hacking, and quickly detects various attacks and threats.

At 320, one or more network devices executing instructions from behavioral analytical logic 125 may analyze the outputs of the multiple behavioral analytics systems to determine if any of the individual behavioral analytics systems are overloaded or slow. If so, the one or more network devices executing the behavioral analytical logic 125 may, at 325, utilize machine learning techniques to analyze the outputs of additional behavioral analytics systems and determine if tasks need to be reorganized or reassigned between the various behavioral analytics systems to balance the load on the behavioral analytics systems. Additionally or alternatively, at 325, the one or more network devices executing the behavioral analytical logic 125 may determine whether the complexity of the analytics algorithm employed by the behavioral analytics system that is currently overloaded or slow should have its operating parameters adjusted. Thus, in the university example discussed above, at 320, the behavioral analytical logic 125 determines, based on the outputs of the single performance analytics system and two parallel security analytics systems, if any of the systems are overloaded. If, for example, the single performance analytics system, the behavioral analytical logic 125 may adjust the algorithms deployed by the single performance analytics system. Alternatively, the behavioral analytical logic 125 may determine whether some of the load from the single performance analytics system should be shifted to the parallel security analytics systems. Any solutions determined to be necessary may be applied at 350, as is discussed in below.

Next, at 330, the meta behavioral analytical logic 125 determines if the results from redundant systems disagree. That is, the behavioral analytical logic 125 determines if any redundant systems are divergent. If any redundant systems are divergent, the behavioral analytical logic 125 utilizes machine learning techniques to determine if there is a failure, hacker attack, etc. and attempts to remedy any previously unknown/undiscovered/unidentified issues at 335. For example, at 335, the behavioral analytical logic 125 may move the load from a divergent system to another system or deploy hacker countermeasures. As a more specific example, in the university network example discussed above, if one of the security analytics systems fails (perhaps because of a server hardware failure), the behavioral analytical logic 125 may immediately (i.e., in real-time) detect discrepancies between the two security analytics systems (i.e., based on divergent report streams). The behavioral analytical logic 125 may then determine whether any actions need to be taken or any countermeasures need to be automatically deployed (i.e., should a report be generated and/or should critical capabilities of the divergent security analytics system be shifted or shut down), and deploy said measures. For instance, the behavioral analytical logic 125 may determine that any users in the network with passwords that are likely to be compromised should be shut out of the network, at least until the vulnerability is addressed. Any solutions determined to be necessary may be applied at 350, as is discussed in below.

Still referring to steps 330 and 335, even if a hacker tries to infect both of the redundant security analytics systems, the hacker may be unable to hack into both redundant security analytics systems exactly simultaneously. Thus, during the time when one system is hacked and the other is not, the behavioral analytical logic 125 will detect a divergence (i.e., a loss of correlation), and determine an appropriate response (which may be automatically applied at 350). Consequently, even if the hacker manages to penetrate one of the two redundant security analytics systems and install malware that will cripple its functions, the hacker may be detected and the threat may be mitigated before the remaining redundant system(s) can be penetrated.

After resolving any divergence issues (i.e., after 330 or 335), the behavioral analytical logic 125 determines, at 340, if there is a need to correlate results from behavioral analytical systems of different types. This may be a rules-based determination that is made with machine learning techniques. For example, in some embodiments, data from different types of behavioral analytical systems may be correlated together when a certain percentage of the behavioral analytical systems are experiencing issues. Alternatively, data from different types of behavioral analytical systems may be correlated together when an issue detected by a particular behavioral analytical system has not been resolved by a certain number of algorithms/permutations or has not been resolved during a predetermined time threshold. That all being said, if, at 340, the behavioral analytical logic 125 determines that correlation is needed across behavioral analytical systems of different types, the behavioral analytical logic 125 utilizes machine learning techniques to merge and correlate the outputs of behavioral analytical systems of different types at 345 (regardless of how the determination is made at 340). At 345, the machine learning techniques generate inferences about the relationships and determine how to correlate the data.

Referring back to the university network example discussed above, the behavioral analytical logic 125 determines that there is a need to correlate results from behavioral analytical systems of different types at 340 when the security analytics system and the network performance are unable to identify an effect and cause, respectively, of identified issues. For example, the security analytics system may discover new hacker activity related to an attack (i.e., activity taking over zombie machines) but may not know the symptoms of the attack. Meanwhile, the parallel performance analytics systems may notice the network performance and load levels are abnormal, but may not know the cause. Consequently, at 345, the behavioral analytical logic 125 may determine, by virtue of its abilities to correlate the reports from multiple types of analytics systems and use machine learning techniques to classify clusters of results and make inferences, that a distributed denial of service attack is aimed at the university network. Consequently, the behavioral analytical logic 125 may determine the degradation in network performance is being caused by a security breach. At 345, the behavioral analytical logic 125 may determine how to respond to this previously unidentified issue and mitigate the threat.

At 350, the behavioral analytical logic 125 can react in several ways once it discovers an anomaly in a behavioral analytical system. For example, the behavioral analytical logic 125 can generate reports or automated responses that are determined necessary at any of the previous steps. The reports may include suspected root causes and resolution recommendations, and may filter the recommendations based on techniques now known or developed hereafter. Meanwhile, the automated responses may automatically resolve problems by adjusting analytics parameters and priorities, balancing (or re-balancing) a load across a suite of behavioral analytical systems (e.g., by transferring resources from performance analytics systems to security analytics systems if the security systems are overloaded or experiencing excessive latency), shut down portions of a network or system, shut down portions of a suite of behavioral analytical systems, and/or any other actions determined to be necessary. As a more specific example, in the university network example discussed above, if anything of concern is detected (i.e., at 320, 325, 330, 335, 340 and/or 345), any non-divergent security analytics systems may generate reports for the network administrators and/or take some automated action, like shutting down devices, ports, and/or users if they are suspected of causing a threat.

At 360, the training data of any machine learning techniques employed by the behavioral analytical logic 125 is updated in view of steps 320, 325, 330, 335, 340 and 345. Additionally or alternatively, at 360, the training data of any machine learning techniques employed by the behavioral analytical logic 125 may be updated in view of the reports generated or automated response performed at 350.

Figure 4:
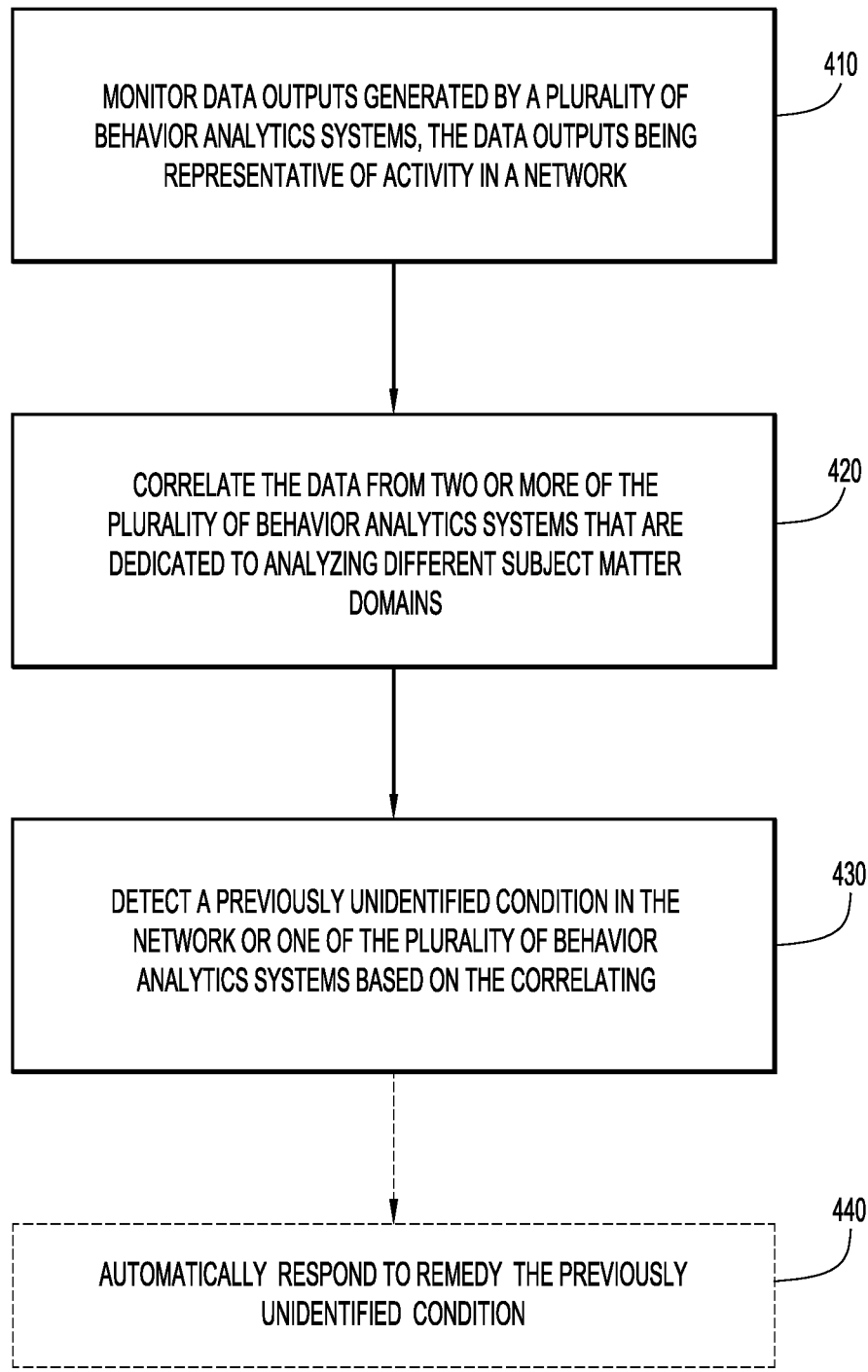
FIG. 4 is a high-level flowchart illustrating a method for executing the meta behavioral analytical techniques presented herein, according to an example embodiment.

Referring next to FIG. 4 for a description of a high-level flow chart of a method 400 depicting operations performed by one or more network devices when executing the meta behavioral analytical logic 125 in accordance with an example embodiment Reference is also made to FIGS. 1A-1C, 2, and 3 for the purposes of the description of FIG. 4.

Initially, at 410, one or more network devices that are operatively coupled to a plurality of behavioral analytics systems associated with a network or system, monitor data outputs of the plurality of behavioral analytics systems, the data outputs being representative of activity in the network or system. At 420, the one or more network devices correlate the data outputs from two or more of the plurality of behavioral analytics systems that are dedicated to analyzing different subject matter domains. Additionally or alternatively, the one or more network devices may also correlate the data of two or more of the plurality of behavioral analytics systems that are dedicated to analyzing the same subject matter domain. At 430, the one or more network devices detect a previously unidentified condition in (a) the network or system or (b) one of the plurality of behavioral analytics systems based on the correlating. For example, the previously unidentified condition may be a security breach of one of the plurality of behavioral analytics systems. Additionally or alternatively, as has been discussed at length, the one or more network systems may detect a divergence between redundant behavioral analytics systems when the data outputs indicate that one of the redundant behavioral analytics systems is not identifying and/or not addressing errors in the network or system.

As has been discussed in detail herein, in some embodiments, the one or more network devices may automatically respond, at 440, to remedy the previously unidentified condition detected at 430. For example, the one or more network devices may disable one or more of the plurality of behavioral analytics systems, cause a portion of the network or system to be disable; or rebalance a load on the plurality of behavioral analytics systems. Additionally or alternatively, the one or more network devices may generate a report with an indication of the previously unidentified condition and an overview of the network or system that is based on the correlating. Moreover, in some embodiments, the one or more network devices may employ machine learning algorithms that perform the correlating and the one or more network devices may continually update the machine learning algorithms based on the correlating.

Figure 5:
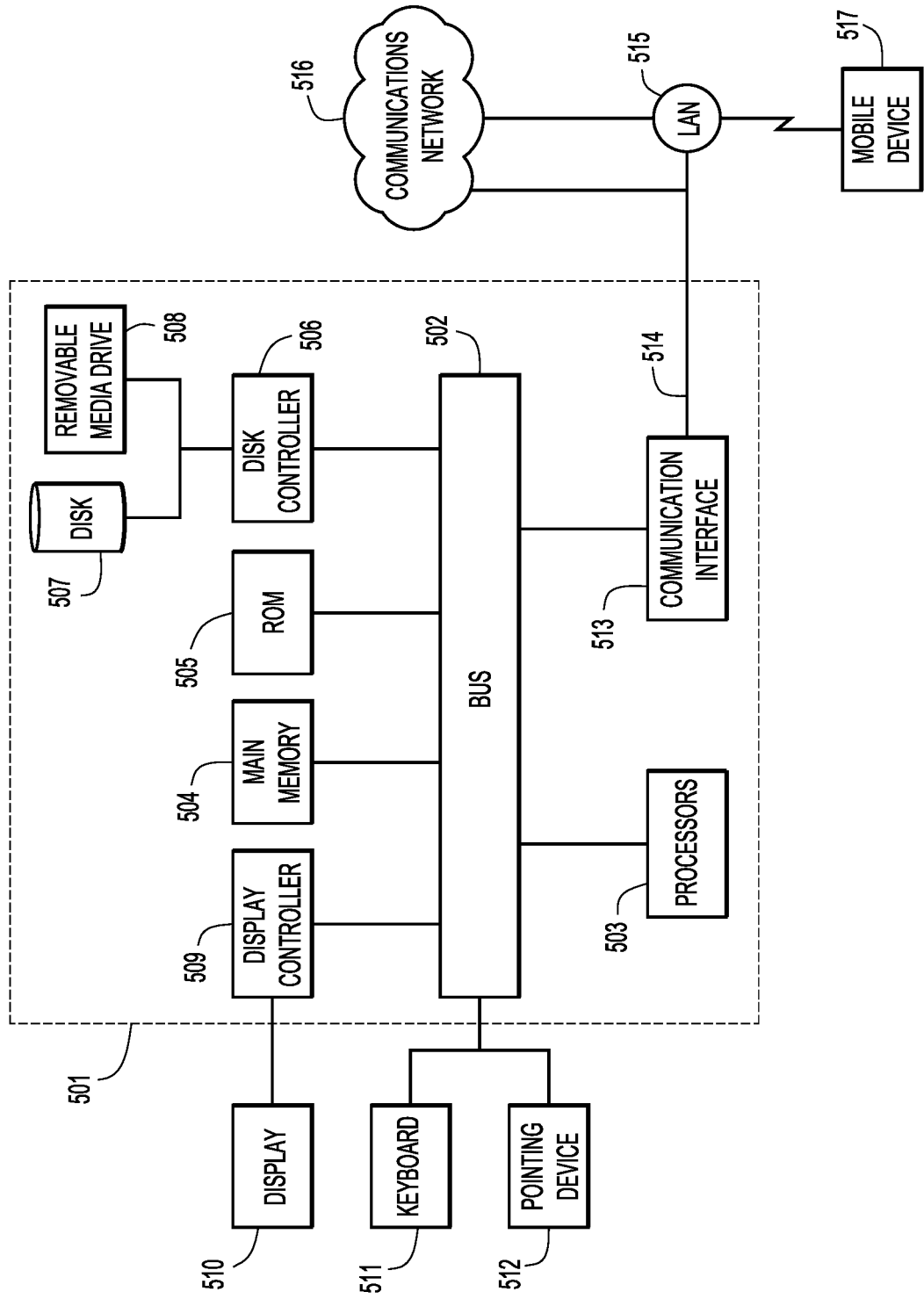
FIG. 5 is a block diagram depicting a computer system upon which the techniques presented herein may be implemented, according to an example embodiment.

Now referring to FIG. 5 for a description of a network element 501 upon which the server systems, network devices in a network or system, and other computing/network elements presented herein may be implemented (i.e., in FIGS. 1A-C). The network element 501 includes a bus 502 or other communication mechanism for communicating information, and processors 503 coupled with the bus 502 for processing the information. While the figure shows a single block 503 for the processors, it should be understood that the processors 503 represent a plurality of processing cores, each of which can perform separate processing. The network element 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processors 503.

The network element 501 further includes a read only memory (ROM) 505 or other static storage device (e.g., programmable ROM (PROM), erasable PROM (EPROM), Flash memory, and electrically erasable PROM (EEPROM)) coupled to the bus 502 for storing static information and instructions for the processors 503.

The network element 501 also includes a disk controller 506 coupled to the bus 502 to control one or more storage devices for storing information and instructions, such as a magnetic hard disk or solid-state disk 507, and a removable media drive 508 (e.g., floppy disk drive, read-only compact disc drive, read/write compact disc drive, tape drive, universal serial bus (USB) memory stick, and removable magneto-optical drive, optical drive). The storage devices may be added to the network element 501 using an appropriate device interface (e.g., small computer system interface (SCSI), integrated device electronics (IDE), enhanced-IDE (E-IDE), USB, direct memory access (DMA), or ultra-DMA).

The network element 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors, graphics processing units (GPUs), and digital signal processors may individually, or collectively, are types of processing circuitry. The processing circuitry may be located in one device or distributed across multiple devices.

The network element 501 may also include a display controller 509 coupled to the bus 502 to control a display 510, such as liquid crystal display (LCD), or a light emitting diode (LED) display, for displaying information to a computer user. The network element 501 includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. The pointing device 512 may also be incorporated into the display device as, for example, a capacitive touchscreen and/or a resistive touchscreen.

The network element 501 performs a portion or all of the processing steps of the invention in response to the processor 503 executing one or more sequences of one or more instructions contained in a memory, such as the main memory 504. Such instructions may be read into the main memory 504 from another computer readable medium, such as a disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the network element 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the network element 501, for driving a device or devices for implementing the invention, and for enabling the network element 501 to interact with a human user (e.g., system administrators). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost. Generally, the computer code devices may store algorithms associated with the techniques presented herein (i.e., algorithms described in connection with FIGS. 2-4) so that the algorithms may be executed on processors 503.

The network element 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network link 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the network element 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The network element 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

To summarize, in one form, a method is provided comprising: at one or more network devices that are operatively coupled to a plurality of behavioral analytics systems associated with a network or system, monitoring data outputs of the plurality of behavioral analytics systems that are representative of activity in the network or system; correlating the data outputs from two or more of the plurality of behavioral analytics systems that are dedicated to analyzing different subject matter domains; and based on the correlating, detecting a previously unidentified condition in: (a) the network or system; or (b) one of the plurality of behavioral analytics systems.

In another form, a system is provided comprising: a plurality of behavioral analytics systems associated with a network or system; and one or more network devices that are operatively coupled to the plurality of behavioral analytics systems and configured to: monitor data outputs of the plurality of behavioral analytics systems that are representative of activity in the network or system; correlate the data outputs from two or more of the plurality of behavioral analytics systems that are dedicated to analyzing different subject matter domains; and based on a correlation, detect a previously unidentified condition in: (a) the network or system; or (b) one of the plurality of behavioral analytics systems.

In yet another form, one or more non-transitory computer-readable storage media is provided encoded with software comprising computer executable instructions and when the software is executed operable to: monitor data outputs of a plurality of behavioral analytics systems that are representative of activity in a network or system; correlate the data outputs from two or more of the plurality of behavioral analytics systems that are dedicated to analyzing different subject matter domains; and based on a correlation, detect a previously unidentified condition in: (a) the network or system; or (b) one of the plurality of behavioral analytics systems.

A number of advantages are achieved via the methods, system, and computer readable media described herein. For example, generally, the techniques presented herein can greatly improve the capabilities and robustness of the analytics systems associated with a network or system, thereby improving an underlying network or system itself. That is, the techniques presented herein can correlate and coordinate the functions of multiple specialized behavioral analytics systems into a more holistic view of the system which may improve the trustworthiness of behavioral analytics systems and their training data. The techniques may also improve behavioral analytics systems by detecting problems with behavioral analytics system training data (skew, for example). Additionally, the techniques presented herein can automatically detect performance or latency problems in a behavioral analytical system and may potentially automatically react to overload situations by adjusting priorities or spinning up additional behavioral analytical resources. That is, the techniques presented herein may transfer resources between various types of behavioral analytical systems to load balance globally.

Moreover, the techniques presented herein may also improve underlying network or system by increasing the speed with which recovery actions are executed in response to detected issues in the network or system. In particular, the techniques presented herein may discover hacking or other security compromises in behavioral analytical systems without waiting for humans to report and respond to abnormal operations. This improves the trustworthiness of the entire suite of behavioral analytical capabilities.

Put another way, the techniques presented herein may enable continuous penetration testing and evaluation of the performance of employed underlying solutions, as well as on-the-fly reconfiguration to improve overall efficacy. In view of these advantages, the techniques presented herein may be highly valuable to any network or system analytics deployment. For example, services organizations can use the techniques presented herein to test their offerings or existing products to ensure their customers are receiving correct insight from a system. The techniques presented herein may also be valuable because they may allow the management of multiple unrelated products to be unified.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
at one or more network devices that are operatively coupled to a plurality of behavioral analytics systems associated with a network or system, monitoring data outputs of the plurality of behavioral analytics systems, wherein each behavioral analytics system monitors and analyzes activity in the network or system;
correlating the data outputs from two or more behavioral analytics systems of the plurality of behavioral analytics systems that are dedicated to analyzing different subject matter domains; and
based on the correlating, detecting a previously unidentified condition in: (a) the network or system; or (b) one of the plurality of behavioral analytics systems, wherein the previously unidentified condition is a divergence between redundant behavioral analytics systems from the plurality of behavioral analytics systems, and wherein the detecting comprises detecting the divergence between the redundant behavioral analytics systems when the data outputs indicate that one of the redundant behavioral analytics systems is not identifying or not addressing errors in the network or system.

2. The method of claim 1, further comprising:
automatically responding to remedy the previously unidentified condition.

3. The method of claim 2, wherein the automatically responding comprises at least one of:
disabling one or more of the plurality of behavioral analytics systems;
causing a portion of the network or system to be disabled; or
rebalancing a load on the plurality of behavioral analytics systems.

4. The method of claim 1, further comprising:
correlating the data outputs from two or more of the plurality of behavioral analytics systems that are dedicated to analyzing a same subject matter domain.

5. The method of claim 1, wherein the correlating employs machine learning algorithms and the method further comprises:
continually updating the machine learning algorithms based on the correlating.

6. The method of claim 1, further comprising:
generating a report with an indication of the previously unidentified condition and an overview of the network or system that is based on the correlating.

7. The method of claim 1, wherein the previously unidentified condition is a security breach of one of the plurality of behavioral analytics systems.

8. The method of claim 1, wherein the data outputs are correlated based on a time at which the data outputs are generated by the two or more behavioral analytics systems.

9. A system comprising:
a plurality of behavioral analytics systems associated with a network or system; and
one or more network devices that are operatively coupled to the plurality of behavioral analytics systems, wherein the one or more network devices each include at least one processor and a memory, and wherein the one or more network devices are configured to:
monitor data outputs of the plurality of behavioral analytics systems, wherein each behavioral analytics system monitors and analyzes activity in the network or system;
correlate the data outputs from two or more behavioral analytics systems of the plurality of behavioral analytics systems that are dedicated to analyzing different subject matter domains; and
based on correlating of the data outputs, detect a previously unidentified condition in: (a) the network or system; or (b) one of the plurality of behavioral analytics systems, wherein the previously unidentified condition is a divergence between redundant behavioral analytics systems from the plurality of behavioral analytics systems, and the one or more network devices are configured to detect the divergence between the redundant behavioral analytics systems when the data outputs indicate that one of the redundant behavioral analytics systems is not identifying or not addressing errors in the network or system.

10. The system of claim 9, wherein the one or more network devices are further configured to:
automatically respond to remedy the previously unidentified condition.

11. The system of claim 10, wherein the one or more network devices are further configured to automatically respond by performing at least one of the following operations:
disabling one or more of the plurality of behavioral analytics systems;
causing a portion of the network or system to be disabled; or
rebalancing a load on the plurality of behavioral analytics systems.

12. The system of claim 9, wherein the one or more network devices are further configured to:
correlate the data outputs from two or more of the plurality of behavioral analytics systems that are dedicated to analyzing a same subject matter domain.

13. The system of claim 9, wherein the one or more network devices employ machine learning algorithms to correlate and the one or more network devices are further configured to:
continually update the machine learning algorithms based on correlations.

14. The system of claim 9, wherein the one or more network devices are further configured to:
generate a report with an indication of the previously unidentified condition and an overview of the network or system that is based on correlating of the data outputs.

15. The system of claim 9, wherein the previously unidentified condition is a security breach of one of the plurality of behavioral analytics systems.

16. The system of claim 9, wherein the data outputs are correlated based on a time at which the data outputs are generated by the two or more behavioral analytics systems.

17. One or more non-transitory computer readable storage media encoded with software comprising computer executable instructions and when the software is executed operable to:
monitor data outputs of a plurality of behavioral analytics systems, wherein each behavioral analytics system monitors and analyzes activity in a network or system;
correlate the data outputs from two or more behavioral analytics systems of the plurality of behavioral analytics systems that are dedicated to analyzing different subject matter domains; and
based on correlating of the data outputs, detect a previously unidentified condition in: (a) the network or system; or (b) one of the plurality of behavioral analytics systems, wherein the previously unidentified condition is a divergence between redundant behavioral analytics systems from the plurality of behavioral analytics systems, and the instructions operable to detect further comprise instructions operable to detect the divergence between the redundant behavioral analytics systems when the data outputs indicate that one of the redundant behavioral analytics systems is not identifying or not addressing errors in the network or system.

18. The one or more non-transitory computer readable storage media of claim 17, further comprising instructions operable to:
   automatically respond to remedy the previously unidentified condition by at least one of:
      disabling one or more of the plurality of behavioral analytics systems;
      causing a portion of the network or system to be disabled; or
      rebalancing a load on the plurality of behavioral analytics systems.

19. The one or more non-transitory computer readable storage media of claim 17, further comprising instructions operable to:
   correlate the data outputs from two or more of the plurality of behavioral analytics systems that are dedicated to analyzing a same subject matter domain.

20. The one or more non-transitory computer readable storage media of claim 17, wherein the data outputs are correlated based on a time at which the data outputs are generated by the two or more behavioral analytics systems.

* * * * *